United States Patent
Hahn

(10) Patent No.: US 8,452,964 B2
(45) Date of Patent: May 28, 2013

(54) METHOD FOR PROVIDING CONFIDENTIALITY PROTECTION OF CONTROL SIGNALING USING CERTIFICATE

(75) Inventor: Geen Beck Hahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 699 days.

(21) Appl. No.: 12/602,981

(22) PCT Filed: Jun. 4, 2008

(86) PCT No.: PCT/KR2008/003120
§ 371 (c)(1), (2), (4) Date: Dec. 3, 2009

(87) PCT Pub. No.: WO2008/153284
PCT Pub. Date: Dec. 18, 2008

(65) Prior Publication Data
US 2010/0177900 A1  Jul. 15, 2010

(30) Foreign Application Priority Data
Jun. 14, 2007 (KR) ........................ 10-2007-0058560

(51) Int. Cl.
*H04L 9/32* (2006.01)

(52) U.S. Cl.
USPC ........... 713/171; 713/150; 713/156; 713/170; 713/189; 380/277; 380/278

(58) Field of Classification Search
USPC .................. 380/277–278; 713/150, 156, 170, 713/171, 189
See application file for complete search history.

(56) References Cited

U.S. PATENT DOCUMENTS

| | | | |
|---|---|---|---|
| RE36,946 E * | 11/2000 | Diffie et al. | 380/278 |
| 7,079,656 B1 | 7/2006 | Menzel et al. | |
| 7,478,236 B2 * | 1/2009 | Roh et al. | 713/157 |
| 7,747,862 B2 * | 6/2010 | Ovadia | 713/176 |
| 7,865,727 B2 * | 1/2011 | Zeng et al. | 713/168 |
| 2003/0108007 A1 | 6/2003 | Holcman et al. | |
| 2005/0003814 A1 * | 1/2005 | Saito et al. | 455/435.1 |
| 2005/0289347 A1 * | 12/2005 | Ovadia | 713/171 |

(Continued)

FOREIGN PATENT DOCUMENTS

KR   10-2001-0076763   8/2001

OTHER PUBLICATIONS

Marks et al., "IEEE Standard for Local and Metropolitan Area Networks—Part 16," IEEE, Feb. 2006, pp. 185-209, pp. 343-345, and pp. 567-577.*

(Continued)

*Primary Examiner* — Luu Pham
(74) *Attorney, Agent, or Firm* — Lee, Hong, Degerman, Kang & Waimey

(57) ABSTRACT

A method of enabling a mobile station (MS) to perform initial ranging in a wireless communication system includes transmitting a first message to a base station (BS), the first message comprising an identifier which is digitally signed by using a private key corresponding to a public key included in a certificate of the MS and receiving a second message including a temporary session key that is digitally signed by using a private key corresponding to a public key included in a certificate of the BS. A security threat due to exposure of control signaling can be prevented by securely exchanging session keys between the BS and the MS.

7 Claims, 5 Drawing Sheets

U.S. PATENT DOCUMENTS

| | | | |
|---|---|---|---|
| 2007/0083766 A1* | 4/2007 | Farnham et al. | 713/176 |
| 2007/0112967 A1 | 5/2007 | Lee et al. | |
| 2008/0065883 A1* | 3/2008 | Zeng et al. | 713/168 |
| 2008/0119185 A1* | 5/2008 | Saito et al. | 455/435.1 |
| 2009/0019284 A1* | 1/2009 | Cho et al. | 713/170 |
| 2010/0093347 A1* | 4/2010 | Hahn et al. | 455/435.1 |
| 2011/0099113 A1* | 4/2011 | Al-Herz et al. | 705/69 |

OTHER PUBLICATIONS

Adibi et al., "Authentication Authorization and Accounting (AAA) Schemes in WiMAX," IEEE, 2006, pp. 1-6.*

* cited by examiner

[Fig. 1]
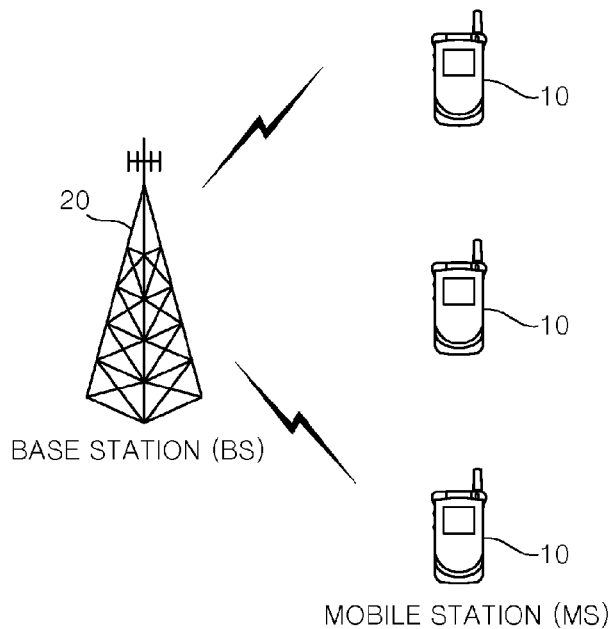
[Fig. 2]
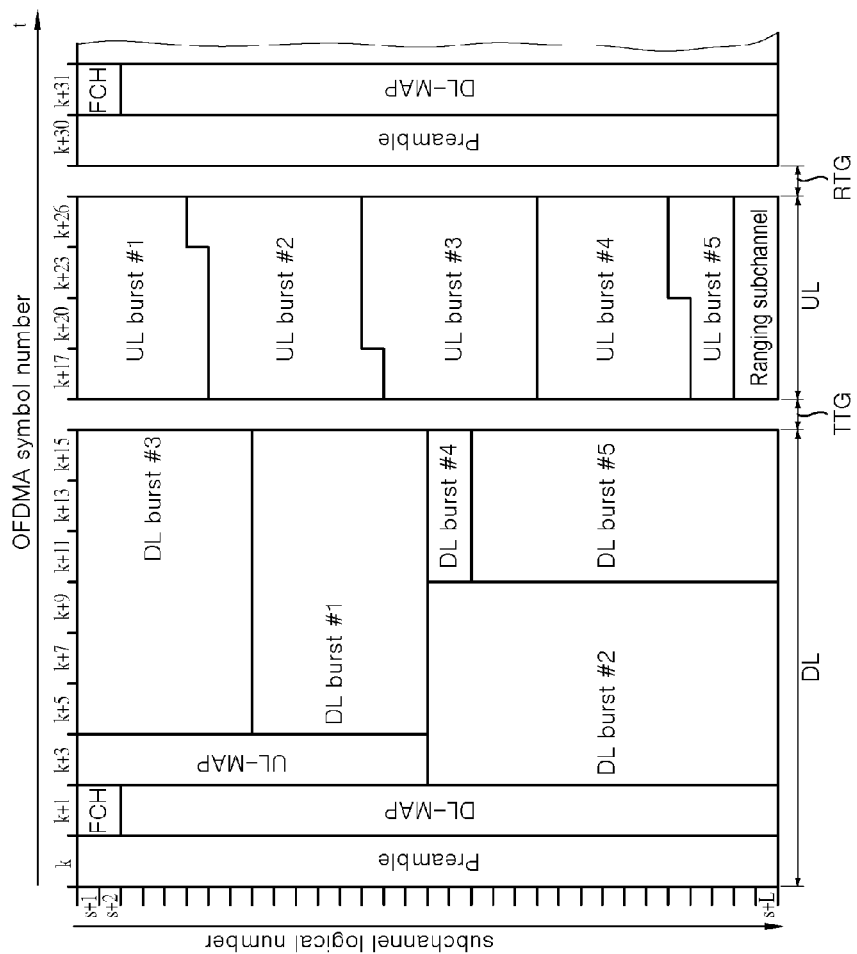

[Fig. 3]
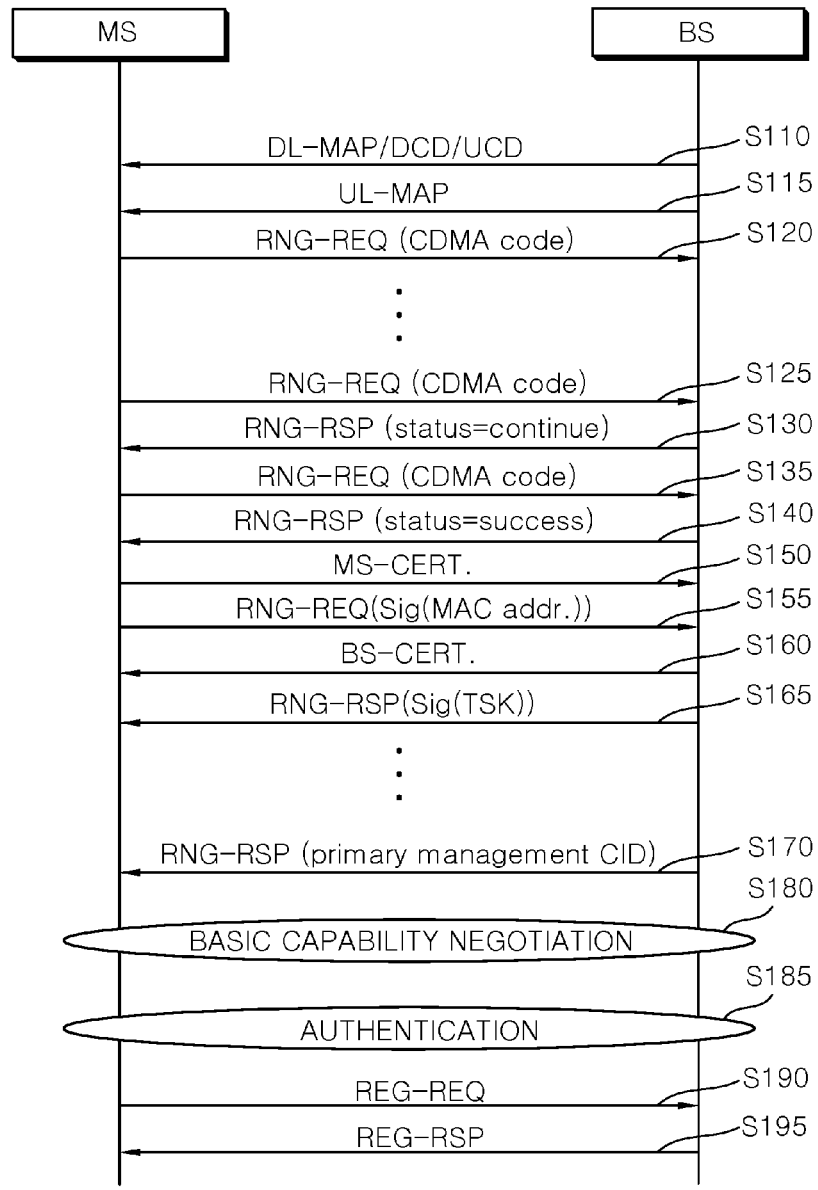
[Fig. 4]
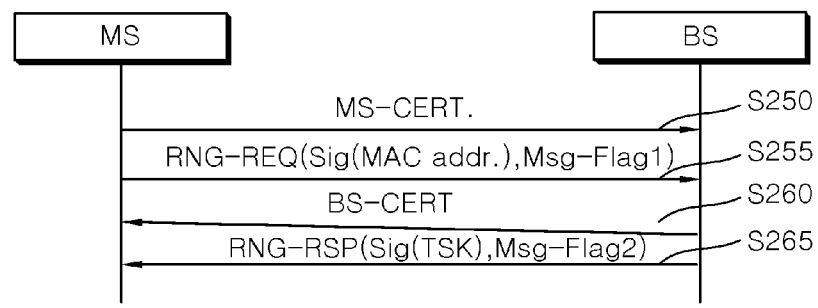

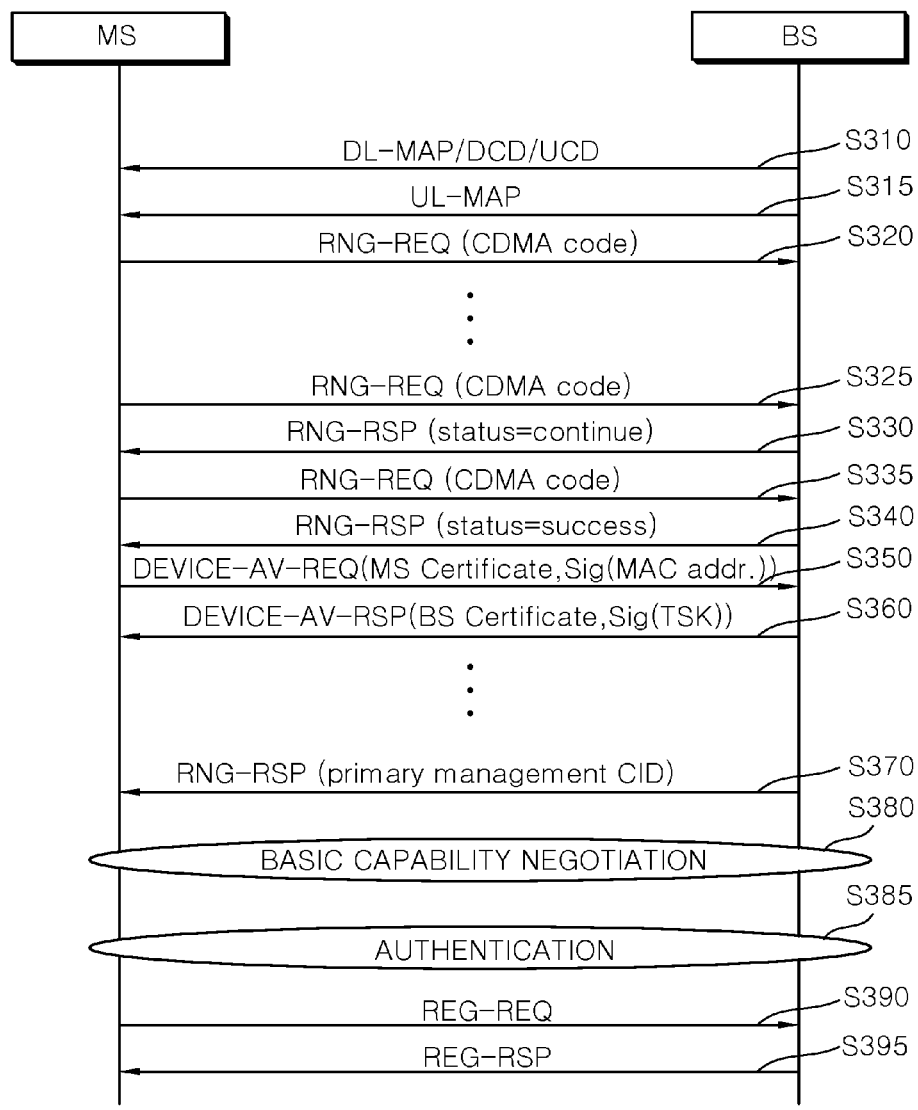
[Fig. 5]

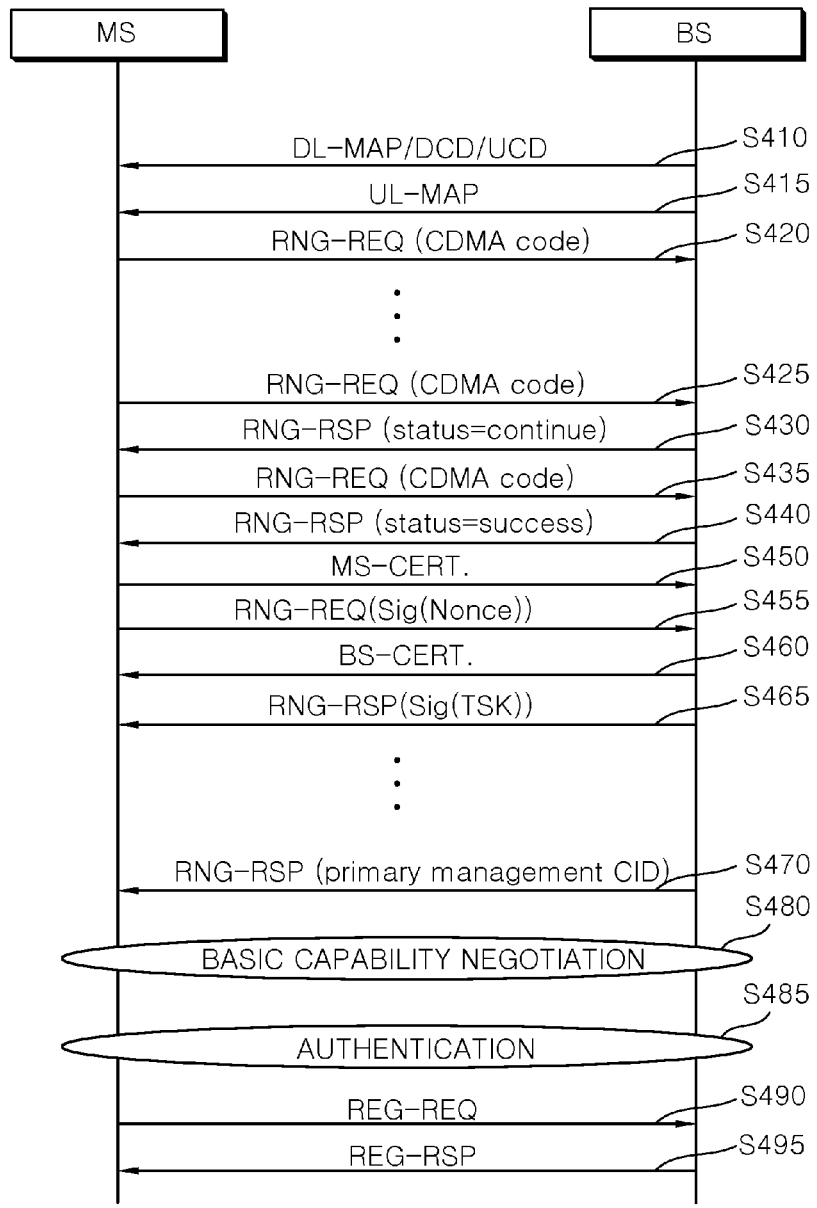
[Fig. 6]

[Fig. 7]
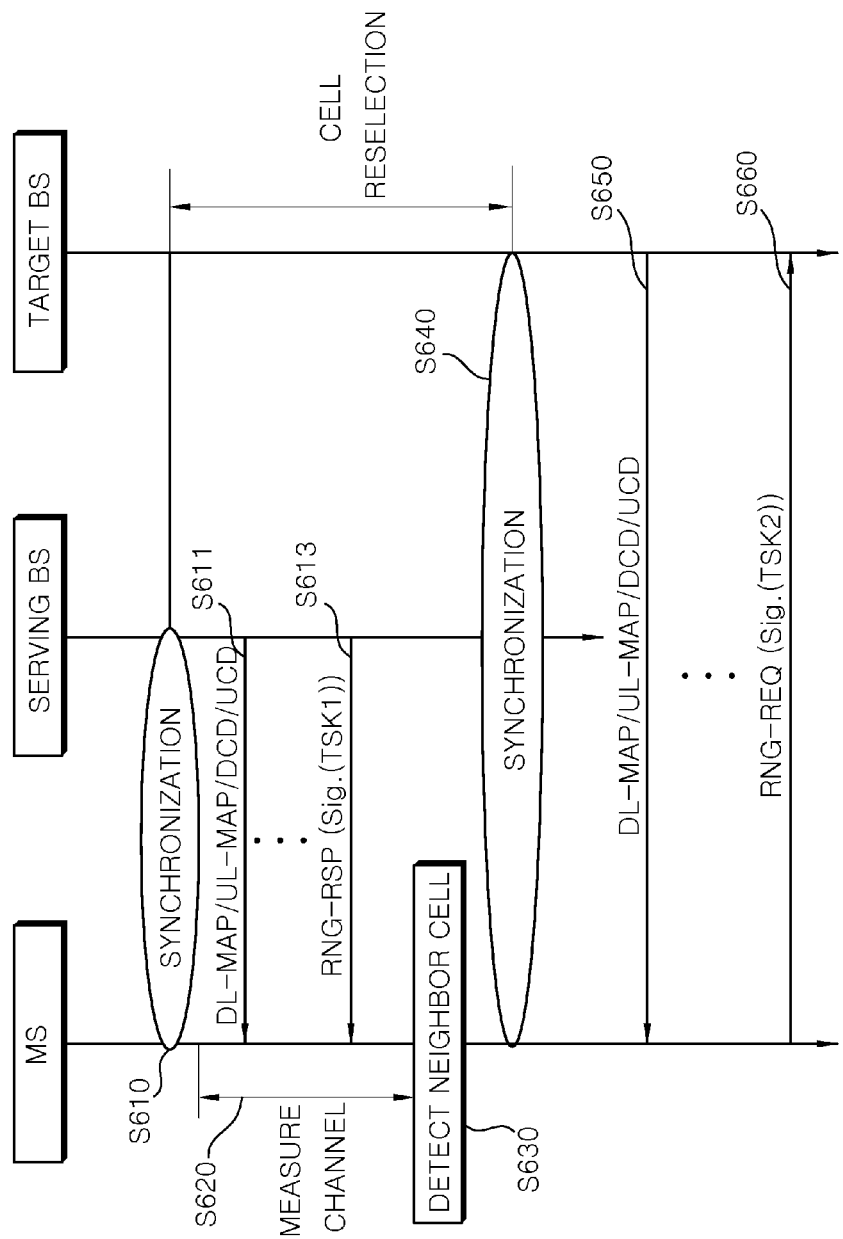
[Fig. 8]
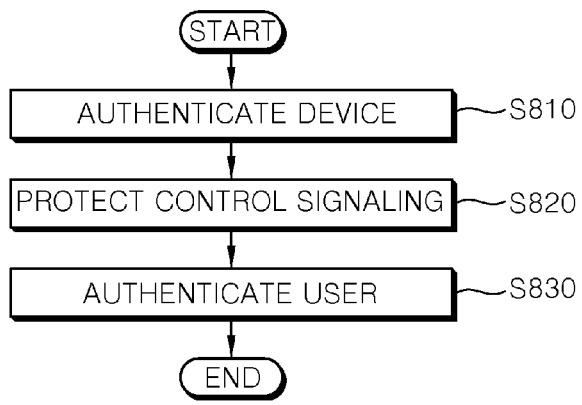

METHOD FOR PROVIDING CONFIDENTIALITY PROTECTION OF CONTROL SIGNALING USING CERTIFICATE

CROSS-REFERENCE TO RELATED APPLICATIONS

This application is the National Stage filing under 35 U.S.C. 371 of International Application No. PCT/KR2008/003120, filed on Jun. 4, 2008, which claims the benefit of earlier filing date and right of priority to Korean Application No. 10-2007-0058560, filed on Jun. 14, 2007.

TECHNICAL FIELD

The present invention relates to a wireless communication process, and more particularly, to a method for protecting confidentiality of control signaling that is to be exchanged before a user is authenticated.

BACKGROUND ART

A next generation multimedia wireless communication system that has been actively researched is required to process not only voices but also images, packet data and the like.

Location based services such as an emergency rescue service or a child monitoring service are one of next generation services. However, unsecured location based services may be vulnerable to an unauthorized access that steals location information of a mobile station (MS). If the location information of the MS is exposed, the location information may be used for unauthorized access and undesired exploitation. Accordingly, it is essential to protect privacy of location information of the MS in a wireless communication system. Capability of protecting the location information of the MS against unknown exploiters is called as location privacy.

Orthogonal frequency division multiplexing (OFDM) is a multi-carrier modulation technique using a plurality of orthogonal subcarriers. Orthogonal frequency division multiple access (OFDMA) is a technique for providing multiplexing of multi-users by combining the OFDM with frequency division multiple access (FDMA) or time division multiple access (TDMA).

IEEE (Institute of Electrical and Electronics Engineers) 802.16 standard is based on the OFDM/OFDMA. In the IEEE 802.16 standard, ranging is a collection of processes by which a MS and a BS maintain the quality of the RF communication link between them. The ranging consists of two types: initial ranging and periodic ranging. The first serves to initiate registration (or re-registration) of a MS with a base station (BS). The second served to periodically readjust physical parameters of the MS and to verify that the MS is still on line. The initial ranging is needed for a procedure in which the MS registers with the BS or a handover.

Hereinafter, downlink indicates communication from the BS to the MS, and uplink indicates communication from the MS to the BS.

Initial ranging is the procedure to obtain an accurate timing offset between the MS and the BS and to adjust transmission power. When a MS is turned on, the MS achieves downlink synchronization from downlink preambles. Subsequently, the MS performs the initial ranging so as to adjust uplink timing offset and transmission power. After the initial ranging is completed, periodic ranging is periodically performed to track uplink timing offset and received signal strength.

In general, after initial ranging is completed, authentication between the MS and the network is performed to allocate a message authentication code. The message authentication code is used to protect messages which are exchanged between a MS and a BS from being exposed to another MS. However, after the initial ranging is successfully completed, additional control signaling such as basic capability negotiation including a request for bandwidth is performed before establishing authentication between the MS and the network. Confidentiality of the control signaling is not supported. When the control signaling is exposed to a malicious attacker, a serious security threat may be caused.

A method is sought for protecting the location privacy and the confidentiality of the control signaling until the authentication is completed after the initial ranging is performed.

DISCLOSURE OF INVENTION

Technical Problem

The present invention provides a method of securing location privacy of a mobile station (MS) from being exposed by exchanging a certificate in initial access.

The present invention also provides a method of preventing control signaling from being exposed in the initial access.

Technical Solution

In an aspect, a method of enabling a mobile station (MS) to perform initial ranging in a wireless communication system is provided. The method includes transmitting a first message to a base station (BS), the first message comprising an identifier which is digitally signed by using a private key corresponding to a public key included in a certificate of the MS and receiving a second message including a temporary session key that is digitally signed by using a private key corresponding to a public key included in a certificate of the BS.

The first message may be a ranging request message and the second message may be a ranging response message.

In another aspect, a method of protecting control signaling in a wireless communication system is provided. The method includes performing device authentication for obtaining a session key by exchanging a certificate of a mobile station (MS) with a certificate of a base station (BS) and performing user authentication by exchanging a control message which is ciphered by using the session key.

Advantageous Effects

A security threat due to exposure of control signaling can be prevented by securely exchanging session keys between a BS and a MS when initializing the network or performing handover. In addition, it is possible to prevent a unique identifier from being exposed to a malicious attacker through a wireless interface and to secure location privacy.

BRIEF DESCRIPTION OF THE DRAWINGS

FIG. 1 is a block diagram illustrating a wireless communication system.

FIG. 2 illustrates an example of a frame structure.

FIG. 3 is a flowchart illustrating a procedure of initializing a network according to an embodiment of the present invention.

FIG. 4 is a flowchart illustrating a method of sharing a temporary session key according to an embodiment of the present invention.

FIG. 5 is a flowchart illustrating a method of initializing a network according to another embodiment of the present invention.

FIG. 6 is a flowchart illustrating a method of initializing a network according to another embodiment of the present invention.

FIG. 7 is a flowchart illustrating a handover procedure according to an embodiment of the present invention.

FIG. 8 is a flowchart illustrating a method of protecting control signaling according to an embodiment of the present invention.

MODE FOR THE INVENTION

FIG. 1 is a block diagram illustrating a wireless communication system. The wireless communication system is widely disposed so as to provide various communication services such as services for providing voices, packet data, and the like.

Referring to FIG. 1, a wireless communication system includes a mobile station (MS) 10 and a base station (BS) 20. The MS 10 may be fixed or movable. The MS 10 may be referred to as user equipments (UEs), user terminals (UTs), subscriber stations (SSs), or wireless devices. The BS 20 indicates a fixed station that communicates with the MS 10. The BS 20 may be referred to as a NodeB, a base transceiver system (BTS), or an access point. The BS 20 may serve one or more cells.

The wireless communication system may be an orthogonal frequency division multiplexing/orthogonal frequency division multiple access (OFDM/OFDMA) based system. The OFDM uses a plurality of orthogonal subcarriers. The OFDM uses orthogonal characteristic between inverse fast Fourier transformation (IFFT) and fast Fourier transformation (FFT). A transmitter transmits data by performing the IFFT. A receiver recovers original data by performing the FFT. The transmitter uses the IFFT so as to combine multiple subcarriers. In order to split the multiple subcarriers, the receiver uses the FFT corresponding to the IFFT.

Hereinafter, a slot is the minimum possible data allocation unit and is defined as a subchannel and a time. In uplink direction, the subchannel may be constructed with a plurality of tiles. The subchannel may be constructed with six tiles. In uplink direction, a burst may be constructed with three OFDM symbols and a subchannel. In permutation of partial usage of subchannels (PUSC), each tile may include four contiguous subcarriers over three OFDM symbols. Alternatively, each tile may include three contiguous subcarriers over three OFDM symbols. A bin includes nine contiguous subcarriers in an OFDM symbol. A band indicates a group of four rows of the bin. An adaptive modulation and coding (AMC) subchannel is constructed with six contiguous bins in the same band.

FIG. 2 illustrates an example of a frame structure. A frame is a data sequence used by physical specifications for a fixed time.

Referring to FIG. 2, a frame includes an uplink frame and a downlink frame. In time division duplex (TDD), uplink and downlink transmission share the same frequency at different times. The downlink frame antecedes the uplink frame. The downlink frame starts in the order of a preamble, a frame control header (FCH), a downlink-map (DL-MAP), a uplink-map (UL-MAP), and burst zones. There are guard times for distinguishing the uplink frame from the downlink frame at center part (between the downlink and uplink frames) and last part (next to the uplink frame). A transmit/receive transition gap (TTG) indicates a gap between a downlink burst and a subsequent uplink burst. A receive/transmit transition gap (RTG) indicates a gap between an uplink burst and a subsequent downlink burst.

The preamble is used to initially synchronize a MS with a BS, search for a cell, and estimate a frequency offset and a channel. The FCH includes a length of a DL-MAP message and coding scheme information for the DL-MAP.

The DL-MAP is an area to which the DL-MAP message is transmitted. The DL-MAP message defines an access of a downlink channel. The DL-MAP message includes a configuration change count of a downlink channel descriptor (DCD) and an identifier (ID) of a BS. The DCD describes a downlink burst profile to be applied to a current MAP. The downlink burst profile represents characteristics of a downlink physical channel. The DCD is periodically transmitted by the BS through the DCD message.

The UL-MAP is an area to which the UL-MAP message is transmitted. The UL-MAP message defines an access of an uplink channel. The UL-MAP message includes a configuration change count of an uplink channel descriptor (UCD) and a valid start time of uplink allocation defined by the UL-MAP. The UCD describes an uplink burst profile. The uplink burst profile represents characteristics of an uplink physical channel. The UCD is periodically transmitted by the BS through the UCD message. The UCD message includes information on a backoff window for ranging.

FIG. 3 is a flowchart illustrating a procedure of initializing a network according to an embodiment of the present invention. The procedure of initializing the network represents a procedure in which an MS initially enters the network. An initial ranging is used to obtain an accurate timing offset between the MS and a BS and adjust transmission power.

Referring to FIG. 3, a MS reads a DL-MAP message that is transmitted by the BS (step S110). To access the network or after losing a signal, the MS needs to obtain a downlink channel. The MS receives a frame by scanning a wireless channel and synchronizes with the BS. When receiving at least one DL-MAP message, the MS can achieve medium access control (MAC) synchronization. After achieving the MAC synchronization, the MS can continuously receive the DL-MAP message, a DCD message and a UCD message. After synchronization, the MS waits for a UCD message from the BS and obtains a transmission parameter on an available uplink channel. The UCD message includes a time when a ranging request is to be transmitted and a frequency in which the ranging request is to be transmitted. The UCD message may specify one or more groups of six (or eight) contiguous subchannels in which a contention based ranging is performed. The contention based ranging indicates a process in which at least one MS can transmit a ranging request through the same subchannel at the same time.

In order to search for an initial ranging interval, the MS reads a UL-MAP message (step S115). The BS allocates the initial ranging interval constructed with at least one transmission opportunity. The transmission opportunity indicates an allocation provided by the UL-MAP so that an authorized predetermined group of MSs transmit an initial ranging request.

The MS transmits a ranging request (RNG-REQ) message (step S120). The BS determines a network delay by using the ranging request message. The ranging request message is used to request a change in power and/or downlink burst profile when initializing the network. The MS randomly selects a ranging slot in a backoff window included in an UCD and randomly selects a code division multiple access (CDMA) code from a set of allowed codes. The CDMA code may use a pseudo-random bit sequence (PRBS) binary phase shift keying (BPSK) code. MSs which transmit the ranging request message through the same ranging slot at the same time are in contention state.

When there is no response from the BS, the MS transmits a ranging request message by increasing a power level in the next contention slot (step S125).

The BS transmits a ranging response (RNG-RSP) message to indicate that the CDMA code is successfully received (step S130). Since the BS does not know which MS transmits the CDMA code, the BS designates the CDMA code and a slot so as to enable the MS to check itself through the slot. The ranging response message is a broadcast message. By using the ranging, the BS determines a symbol timing offset due to a transmission delay, a Doppler shift or a frequency offset due to inaccuracy of an oscillator, receiving power, and the like. The BS transmits correction to the MS through the ranging response message. The MS continues to perform the ranging until power, timing and a frequency are aligned. The ranging response message also includes information on a ranging status. When the ranging status is 'continue', although the transmission attempt is not successful, the MS performs correction included in the ranging response message and registers another CDMA code after a suitable backoff delay.

When the ranging status of the ranging response message is 'continue', the MS continuously transmits the CDMA code through the ranging request message (step S135). The MS updates the timing and the power designated by the ranging response message and transmits the ranging request message.

The BS transmits the ranging response message of which ranging status is 'success' (step S140). The BS continues to perform fine tuning through the ranging response message. The ranging request/response processes are repeated until the MS receives the ranging response message of which ranging status is 'success' or 'abort'.

After receiving the ranging response message of which ranging status is success, the MS transmits an MS certificate (MS-CERT) message including a certificate of the MS (step S150). The certificate is electronic information for confirming and verifying that a public key is matched with a private key of the MS. The certificate is previously stored in the MS.

The MS transmits a ranging request message including a MAC address of the MS that is digitally signed in addition to the MS certificate message, at the same time or at a predetermined time interval (step S155). The MS digitally signs the MAC address by using the private key corresponding to the public key included in the certificate of the MS. The MS can verify that the MS has a legal private key to the BS.

The ranging is a contention based process. Accordingly, in a case where the ranging is successfully performed, an unique identifier for identifying the corresponding MS is necessary. At this time, in a case where the unique identifier of the MS such as the MAC address is transmitted without any protection, a location privacy problem may occur. It is possible to enable the BS to confirm that the MS has a legal private key and to prevent the MAC address from being exposed by enabling the MS to sign the unique identifier (e.g. MAC address) by using the certificate and the private key corresponding to the public key included in the certificate.

The MAC address is an example of the unique identifier of the MS. Another unique identifier may be used. The MAC address is allocated in a manufacturing procedure and used to identify the MS. The unique identifier of the MS which is used for a universal mobile telecommunication system (UMTS) may be an international mobile subscriber identity (IMSI) or international mobile equipment identity (IMEI). The IMSI is a private record that is stored in a subscriber identity module (SIM) and a home location register (HLR). The IMEI discloses a terminal manufacturer, a model number, and a serial number.

The BS transmits a BS certificate (BS-CERT) message including a certificate of the BS (step S160).

The BS transmits a ranging response message including a temporary session key (TSK) that is digitally signed in addition to the BS certificate message, at the same time or at a predetermined time interval (step S165). The BS digitally signs the TSK by using the private key corresponding to the public key included in the certificate of the BS. The BS can verify that the BS has a legal private key to the MS. The BS can randomly generate the TSK.

The MS and the BS can share the TSK for protecting control signaling by adding a 2-way handshake process to the initial ranging process. After the MS and the BS share the TSK, all the signaling can be securely transmitted. That is, it is possible to cipher the MAC addresses that are to be exchanged between the MS and the BS after the TSK is shared during the initial ranging. Accordingly, it is possible to securely exchange MAC messages even before establishing authentication.

The BS transmits the ranging response message including a ciphered primary management connection identifier (CID) (step S170). The CID indicates a value for checking a connection between the BS and the MS in the MAC. The primary management CID indicates a CID for a connection that is established during the initial ranging and used to transmit a delay-tolerant MAC message. It is possible to cipher the primary management CID by using the TSK. Thus, it is also possible to protect control signaling from a malicious attacker. The initial ranging is completed by transmitting the primary management CID.

The BS and the MS negotiate basic capability (step S180). Immediately when the ranging process is completed, the MS transmits a basic capability request (SBS-REQ) message including basic capability of its own. The basic capability of the MS includes information on whether an automatic repeat request (ARQ) is supported and information on whether a MAC level cyclic redundancy check (CRC) is supported. The BS transmits a basic capability response (SBC-RSP) message in response to the basic capability request message. It is possible to securely protect messages according to the basic capability negotiation by using the TSK.

The MS and the BS authenticate each other and exchange authorization keys with each other (step S185). The MS and the BS are primarily authenticated in the initial ranging and secondarily authenticated after the basic capability negotiation is completed. The primary authentication process can be called as a device authorization process related to an unique identifier of the MS. The secondary authentication process can be called as a process of authenticating a user.

The MS transmits a registration request (REG-REQ) message (step S190). The registration request message includes the primary management CID.

The BS transmits a registration response (REG-RSP) message in response to the registration request message (step S195). The registration response message includes a secondary management CID. The secondary management CID is established while registering the MS. The secondary management CID is a CID related to connection that is used to transmit a standards-based message such as a simple network management protocol (SNMP) or a dynamic host configuration protocol (DHCP).

After registering the MS, IP connectivity is established, time of day is established, and other operation parameters are transmitted. Accordingly, the connection is set up.

The initial ranging is performed when the MS enters the network or performs handover. The initial ranging is constructed with a series of exchanges of ranging request messages and ranging response messages. When the initial ranging is successfully completed, in a case where the unique identifier of the MS is transmitted to the network through a ranging request message as it is, the unique identifier may be exposed to a malicious attacker. The location privacy problem means active or passive attack against the unique identifier of the MS. That is, the location privacy problem includes simple wiretapping of the MS identifiers that are exchanged between the network and the MS and various attacks using the same. For example, a malicious attacker that obtains the MAC address may pretend to be a normal MS. In order to secure the location privacy, the ciphered MAC messages are transmitted in the initial ranging. Although the MAC addresses are exchanged in the initial ranging, it is possible not to expose the MAC address to the malicious attacker. Here, the initial ranging is a process performed during network initialization or handover. In addition, it is possible to protect the control signaling until the authentication process starts after the initial ranging is completed.

In a case where the MS accesses the network, the network and the MS exchange certificates with each other and share a session key, thereby ciphering and transmitting a control message such as an unique identifier or MAC message. A ciphering process through the session key may be applied to the control signaling that is to be exchanged between the MS and the network until the authentication process starts, thereby enabling the MAC management message to be securely transmitted and securing data confidentiality.

FIG. 4 is a flowchart illustrating a method of sharing a TSK according to an embodiment of the present invention. This is another embodiment of steps S150 to S165 of FIG. 3.

Referring to FIG. 4, a MS transmits a MS certificate (MS-CERT) message including an certificate of the MS (step S250).

The MS transmits a ranging request message including the MAC address of the MS that is digitally signed at the same time or at a predetermined time interval (step S255). The ranging request message may include a first message flag (Msg_Flag1) to indicate whether the MS certificate message is transmitted. The first message flag is a field for notifying the BS of information on whether the MS certificate message is transmitted.

The ranging request message may be transmitted together with the MS certificate message at the same time, transmitted before the MS certificate message is transmitted, or transmitted after the MS certificate message is transmitted. In a case where two messages are transmitted to the BS, if it is reported that another message is transmitted through at least one message, the report helps to determine whether the BS receives the two messages.

The first message flag is included in the ranging request message. However, the first message flag may be included in the MS certificate message or included in both of the ranging request message and the MS certificate message.

The BS transmits a BS certificate (BS-CERT) message including a certificate of the BS (step S260).

The BS transmits a ranging response message including a TSK that is digitally signed at the same time or at a predetermined time interval (step S265). The ranging response message may include a second message flag (Msg_Flag2) to indicate whether the BS certificate message is transmitted. The second message flag is a field for notifying the MS of information on whether the BS certificate message is transmitted. Here, the second message flag is included in the ranging response message. However, the second message flag may be included in the certificate of the BS or included in both of the ranging response message and the BS certificate message.

A first message (the ranging request message or ranging response message) includes a message flag to indicate whether a second message (the MS certificate message or the BS certificate message) is transmitted. The BS (or the MS) can recognize whether the second message is received through a timer after the first message is received. In a case where the timer is expired, the MS (or the BS) is requested to retransmit the second message.

In a case where a status in which the first and second messages are not received may be continued during predetermined times of retransmissions or in a case where a predetermined time is elapsed, the MS and the BS begins the ranging again.

FIG. 5 is a flowchart illustrating a method of initializing a network according to another embodiment of the present invention.

Referring to FIG. 5, the MS reads a DL-MAP message that is transmitted from the BS (step S310). In order to search for an initial ranging interval, the MS reads an UL-MAP message (step S315). The MS transmits a ranging request (RNG-REQ) message (step S320).

When there is no response from the BS, the MS transmits a ranging request message after increasing a power level in the next contention slot (step S325).

The BS transmits a ranging response (RNG-RSP) message to indicate that the CDMA code is successfully received (step S330). When the ranging status of the received ranging response message is 'continue', the MS continuously transmits the CDMA code through the ranging request message (step S335). The BS transmits the ranging response message of which ranging status is 'success' (step S340).

The MS transmits a device authentication request (DEVICE-AU-REQ) message after receiving the ranging response message of which ranging status is 'success' (step S350). The device authentication request message includes a MS certificate and the MAC address that is digitally signed by using a private key corresponding to a public key in the MS certificate.

The BS transmits a device authentication response (DEVICE-AU-RSP) message (step S360). The device authentication response message includes a BS certificate and a temporary session key (TSK) that is digitally signed by using a private key corresponding to a public key in the BS certificate.

It is possible to reduce overhead due to transmission of messages by transmitting the certificate and the MAC address (or the TSK) through a single message.

The BS transmits the ranging response message including a ciphered primary management CID (step S370). The BS and the MS negotiate basic capability (step S380). The MS and the BS authenticate each other and exchange authorization keys with each other (step S385). This is a user authentication process for authenticate a user. The MS transmits a registration request (REG-REQ) message (step S390). The BS transmits a registration response (REG-RSP) message in response to the registration request message (step S395).

FIG. 6 is a flowchart illustrating a method of initializing a network according to another embodiment of the present invention.

Referring to FIG. 6, a MS reads a DL-MAP message that is transmitted by a BS (step S410). In order to search for an initial ranging interval, the MS reads an UL-MAP message (step S415). The MS transmits a ranging request (RNG-REQ) message (step S420).

When there is no response from the BS, the MS transmits a ranging request message after increasing a power level in the next contention slot (step S425).

The BS transmits a ranging response (RNG-RSP) message to indicate that the CDMA code is successfully received (step S430). When the ranging status of the received ranging response message is 'continue', the MS continuously transmits the CDMA code through the ranging request message (step S435). The BS transmits the ranging response message of which ranging status is 'success' (step S440).

After receiving a ranging response message of which ranging status is 'success', the MS transmits an MS certificate (MS-CERT) message including a MS certificate (step S450). The MS transmits a ranging request message including a nonce that is digitally signed at the same time or at a predetermined time interval (step S455). The nonce is a value which is randomly generated by the MS.

Since the BS receives the nonce that is signed by using the private key of the MS, the BS can confirm that the ranging request message is transmitted by the owner of the certificate. That is, the nonce can serve as an identifier. The nonce may be used until the authentication process starts. When the authentication process starts, the MAC address of the MS may be transmitted to the BS. To regard the nonce as a temporary identifier of the MS, the BS keeps mapping information between a CID and the nonce.

The BS transmits a BS certificate (BS-CERT) message of the BS including a BS certificate (step S460). The BS transmits a ranging response message including a TSK that is digitally signed at the same time or at a predetermined time interval (step S465). The BS digitally signs the TSK by using a private key corresponding to a public key in the BS certificate.

The BS transmits the ranging response message including a ciphered primary management CID (step S470). The BS and the MS negotiate basic capability (step S480). The MS and the BS authenticate each other and exchange authorization keys with each other (step S485). This is a user authentication process for authenticate a user. The MS transmits a registration request (REG-REQ) message (step S490). The BS transmits a registration response (REG-RSP) message in response to the registration request message (step S495).

FIG. 7 is a flowchart illustrating a handover procedure according to an embodiment of the present invention. In the handover procedure, an MS moves from a wireless interface provided by a BS moves to a wireless interface provided by another BS. The handover procedure may be referred to as a handoff procedure. A serving BS indicates a BS in which registration of the MS is most recently completed. A target BS is a BS in which the MS is to be registered as the result of the handover process. A neighbor BS indicates a BS that is not a serving BS.

Referring to FIG. 7, a MS obtains synchronization with a serving BS (step S610). The MS obtains a downlink parameter and an uplink parameter by receiving a DL-MAP message, a UL-MAP message, a DCD message and a UCD message (step S611). The MS starts the initial ranging by transmitting a ranging request message to the serving BS and receives a ranging response message including a first TSK (TSK1) (step S613). The first TSK TSK1 is digitally signed by using a private key corresponding to a public key included in a certificate of the serving BS. The MS can receive a BS certificate message including the certificate of the serving BS in addition to the ranging request message.

The MS continuously measures a channel after obtaining synchronization with the serving BS (step S620). The MS senses the neighbor cell (or neighbor BS) (step S630). The MS can utilize information obtained from a neighbor advertisement (NBR-ADV) message so as to search for an available neighbor BS. A cell reselection is that the MS searches for neighbor BSs and determine suitability thereof in consideration of performance of the neighbor BSs.

The handover starts when the MS determines to move from the serving BS to a target BS. Determination of the handover may be originated the MS or the serving BS. The serving BS may transmit a BS handover request (BSHO-REQ) message to initiate the handover. The MS may transmit a MS handover request (MSHO-REQ) message to initiate the handover. The serving BS may transmit a BS handover response (BSHO-RSP) message in response to the MSHO-REQ message. When the MSHO-REQ message is transmitted by the MS, the MS may indicate one or more available target BSs. When the BSHO-REQ message is transmitted by the serving BS, the serving BS may indicate one or more available target BSs.

The MS transmits a handover indication (HO-IND) message to start the handover. The serving BS terminates the service of the MS according to the HO-IND message. When the MS cancels or rejects the handover, the MS transmits a HO-IND message in addition to a suitable field.

The MS synchronizes with the target BS (step S640). The MS obtains a downlink parameter and an uplink parameter by receiving a DL-MAP message, a UL-MAP message, a DCD message and a UCD message (step S650).

The MS receives a ranging response message including a second TSK (TSK2) by beginning the initial ranging by transmitting the ranging request message to the target BS (step S660). The second TSK (TSK2) is digitally signed by using a private key corresponding to a public key included in a certificate of the target BS. The MS can receive the BS certificate message including the certificate of the target BS in addition to the ranging request message.

An additional exchange of control signaling is not required during the initial ranging while the handover is being performed. This is because a new BS (target BS) and the MS share a new TSK (the second TSK). Whenever the MS handovers between BSs, a new TSK is generated and transmitted to the MS. In a case where the MS uses a nonce, the MS generates different nonces for new BSs. Accordingly, additional control signaling in the network is not necessary.

FIG. 8 is a flowchart illustrating a method of protecting control signaling according to an embodiment of the present invention.

Referring to FIG. 8, a MS and a BS share a session key by performing device authentication (step S810). The device authentication is an authentication procedure that is performed through an unique identifier of the MS or nonce. The device authentication may be performed during initial ranging. The MS and the BS exchange certificates with each other, and the BS notifies the MS of the session key.

Control signaling is protected by transmitting and receiving a control message that is ciphered through the session key (step S820). A threat to security is prevented by ciphering and transmitting a control signal between the MS and the BS such as wireless resource allocation and basic capability negotiation.

The BS authenticates a user (step S830). Since a plurality of users can use an MS, users are authorized, respectively.

It is possible to protect control signaling that is transmitted and received between the MS and the BS by performing the device authentication before the user is authenticated.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of enabling a mobile station (MS) to perform an initial ranging in a wireless communication system, the method comprising:
    transmitting a MS certificate message to a base station (BS), the MS certificate message comprising a certificate of the MS;
    transmitting a ranging request message to the BS, the ranging request message comprising an identifier for identifying the MS, the identifier is digitally signed using a private key corresponding to a public key included in the certificate of the MS;
    receiving a BS certificate message from the BS, the BS certificate message comprising a certificate of the BS;
    receiving a ranging response message from the BS, the ranging response message comprising a temporary session key (TSK) that is digitally signed by using a private key corresponding to a public key included in the certificate of the BS;
    securely transmitting control signaling to the BS using the TSK or securely receiving control signaling from the BS using the TSK;
    receiving a primary management connection identifier (CID) from the BS, the primary management CID is encrypted using the TSK, the primary management CID indicating a CID for a connection established during an initial ranging for transmitting a delay-tolerant media access control (MAC) message, the CID indicating a value for checking a connection between the BS and the MS in a MAC layer;
    transmitting an authorization key to the BS or receiving an authorization key from the BS;
    transmitting a registration request message to the BS, the registration request message comprising the primary management CID; and
    receiving a registration response message comprising a secondary management CID in response to the registration request message, the secondary management CID indicating a CID related to a connection for transmitting standards-based messages.

2. The method of claim 1, wherein the identifier included in the ranging request message is the MAC address of the MS.

3. The method of claim 1, wherein the identifier included in the ranging request message is a nonce which is randomly generated by the MS.

4. The method of claim 1, wherein the ranging request message further comprises a message flag indicating whether the MS certificate message is transmitted.

5. The method of claim 1, wherein the ranging response message further comprises a message flag indicating whether the BS certificate message is transmitted.

6. The method of claim 1, wherein the MS certificate message and the ranging request message are transmitted in a device authentication request message.

7. The method of claim 1, wherein the BS certificate message and the ranging response message are received in a device authentication response message.

* * * * *